United States Patent
Fink et al.

(10) Patent No.: US 10,143,302 B2
(45) Date of Patent: Dec. 4, 2018

(54) METHOD FOR MACHINING DRAWERS OF AN ARTICLE OF FURNITURE

(71) Applicant: Gulfstream Aerospace Corporation, Savannah, GA (US)

(72) Inventors: Ronald Fink, Savannah, GA (US); Blake Porto, Savannah, GA (US); Mark Prince, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 15/084,233

(22) Filed: Mar. 29, 2016

(65) Prior Publication Data
US 2017/0280871 A1 Oct. 5, 2017

(51) Int. Cl.
| | |
|---|---|
| *A47B 88/04* | (2006.01) |
| *B23C 3/00* | (2006.01) |
| *B23G 1/00* | (2006.01) |
| *B27C 5/00* | (2006.01) |
| *B27C 1/00* | (2006.01) |

(52) U.S. Cl.
CPC ............. *A47B 88/04* (2013.01); *B23C 3/00* (2013.01); *B23G 1/00* (2013.01); *B27C 1/005* (2013.01); *B27C 5/00* (2013.01)

(58) Field of Classification Search
CPC ........ B27M 3/00; B27M 3/0013; B27M 3/18; B27M 3/34; B27M 3/36; B27C 5/10; B27C 9/00; B27C 9/005; B27C 9/02; B27C 1/00; B27C 1/02; B27C 1/14; B05B 13/0285; A47B 61/02; A47B 67/00; A47B 88/04; B64D 11/00

USPC ... 83/435.11, 435.15–435.19, 435.27, 435.2; 144/350

See application file for complete search history.

(56) References Cited

U.S. PATENT DOCUMENTS

| | | | | |
|---|---|---|---|---|
| 2,615,776 | A * | 10/1952 | Lorentzen | A47B 67/00 312/289 |
| 6,090,204 | A * | 7/2000 | Speed | B05B 13/0285 118/500 |
| 6,909,517 | B2 * | 6/2005 | Coleman | G05B 19/401 356/620 |
| 7,003,865 | B1 * | 2/2006 | Blevio, Sr. | B27C 5/02 144/329 |
| 7,008,152 | B2 * | 3/2006 | Geiger | B23Q 1/017 29/27 C |

(Continued)

OTHER PUBLICATIONS www.Youtube.com https://www.youtube.com/watch?v=knk4vWXl5ZQ horizontal Motising Machine By Learning Tree Woodworks Uploaded May 27, 2011.*

*Primary Examiner* — Shelley Self
*Assistant Examiner* — Smith O Bapthelus
(74) *Attorney, Agent, or Firm* — LKGlobal | Lorenz & Kopf, LLP (57) ABSTRACT

A method for machining a plurality of surfaces of a respective plurality of drawers in an article of furniture includes mounting the article of furniture to a support structure to form a work piece, positioning the work piece on a base of a vertical gantry router in an orientation such that the plurality of surfaces are generally perpendicular to a cutting head of the vertical gantry router, and machining the plurality of surfaces with the vertical gantry router until the plurality of surfaces are substantially flat and substantially coplanar with one another.

20 Claims, 11 Drawing Sheets

(56) References Cited

U.S. PATENT DOCUMENTS

| | | | |
|---|---|---|---|
| 7,111,656 B2 * | 9/2006 | Cureton | B44C 1/22 |
| | | | 144/364 |
| 8,717,776 B2 * | 5/2014 | Colongo | H05K 7/1449 |
| | | | 29/825 |
| 2010/0054887 A1 * | 3/2010 | Chen | B23C 1/027 |
| | | | 409/163 |
| 2010/0173122 A1 * | 7/2010 | Susnjara | A47B 47/042 |
| | | | 428/119 |
| 2011/0226384 A1 * | 9/2011 | Kinsler | B27C 1/14 |
| | | | 144/278.1 |

* cited by examiner

METHOD FOR MACHINING DRAWERS OF AN ARTICLE OF FURNITURE

TECHNICAL FIELD

The present invention generally relates to furniture construction and more particularly relates to a method for machining the surfaces of the drawers of an article of furniture in a manner that makes each surface substantially coplanar with each of the other surfaces.

BACKGROUND

When building furniture (e.g., a cabinet with multiple drawers) for use onboard an aircraft or in other applications, the materials used are not perfectly square (e.g., they are not perfectly straight and their sides are not perfectly orthogonal). Rather, the furniture components have been fabricated with certain tolerances for deviation from square. In view of these tolerances, prefabricated cabinet drawers have a sacrificial layer known as "drawer scribe". The drawer scribe of each drawer is intended to be sanded down to a level that will allow all of the drawer faces to be coplaner. When all of the drawer faces are coplaner, it is referred to as being "in float". When the drawers are in float, the face of the article of furniture will be substantially planar, without any warps, curves or bows.

The process of sanding down the drawer scribe is an iterative process. Conventionally, it is done by hand, one drawer at a time. Because each drawer is done one at a time by hand, this process is time consuming, requires highly skilled workers, and yields cabinets that are not precisely uniform with one another.

It is desirable to provide a method for bringing the faces of the drawers of an article of furniture into float more quickly, with less skill, and in a repeatable manner. Furthermore, other desirable features and characteristics will become apparent from the subsequent summary and detailed description and the appended claims, taken in conjunction with the accompanying drawings and the foregoing technical field and background.

BRIEF SUMMARY

Methods for machining a plurality of surfaces of a respective plurality of drawers of an article of furniture are disclosed herein.

In a first non-limiting embodiment, the method includes, but is not limited to, mounting the article of furniture to a support structure to form a work piece. The method further includes, but is not limited to, positioning the work piece on a base of a vertical gantry router in an orientation such that the plurality of surfaces are generally perpendicular to a cutting head of the vertical gantry router. The method still further includes, but is not limited to, machining the plurality of surfaces with the vertical gantry router until the plurality of surfaces are substantially flat and substantially coplanar with one another.

In another non-limiting embodiment, the method includes, but is not limited to, mounting a pair of side plates to opposite sides of the article of furniture to form a work piece. Each side plate has a forward edge and a bottom edge that are substantially square to one another. The method further includes, but is not limited to, positioning the work piece on a base of a vertical gantry router. The base is substantially square to a cutting head of the vertical gantry router. The work piece is supported on the base by a bottom surface of each side plate of the pair of side plates. The method further includes, but is not limited to, indexing the work piece with respect to the cutting head. The method further includes, but is not limited to, extending each drawer of the respective plurality of drawers to an extended position such that each surface of the plurality of surfaces is generally planer with each other surface of the plurality of surfaces. The method further includes, but is not limited to, fixing each drawer of the plurality of drawers in the extended position. The method further includes, but is not limited to, machining each surface of the plurality of surfaces until each surface is substantially flat and substantially coplanar with each other surface of the plurality of surfaces.

BRIEF DESCRIPTION OF THE DRAWINGS

The present invention will hereinafter be described in conjunction with the following drawing figures, wherein like numerals denote like elements.

FIGS. 7A-C is a series of illustrations illustrating a front view of the work piece of FIG. 3 during the performance of one of the steps of the method of FIG. 1;

DETAILED DESCRIPTION

The following detailed description is merely exemplary in nature and is not intended to limit the invention or the application and uses of the invention. Furthermore, there is no intention to be bound by any theory presented in the preceding background or the following detailed description.

An improved method for placing the surfaces of the drawers of an article of furniture in float (in a flat, coplanar arrangement) is disclosed herein. Unlike the conventional method, in which a cabinet maker handled each drawer one at a time and which entailed the iterative, time consuming process of sanding and aligning the surfaces of the drawers by hand, the present method employs a vertical gantry router to machine the surfaces of the all of the drawers contemporaneously while the drawers remain in the article of furniture and while the article of furniture is oriented in the orientation it will occupy when it is installed in its intended installation location (aircraft, ship, etc . . . ). In a non-limiting embodiment, the article of furniture is mounted to a support structure that supports the article of furniture on the vertical gantry router. The drawers are extended, if necessary, to be generally coplanar with one another and are then fixed in that extended position. The cutter head of the vertical gantry router makes a series of cutting passes across the surfaces of the extended drawers until all of the surfaces are all flat and coplanar. Unlike the conventional method described in the background above, the method of the present disclosure treats the surfaces of all of the drawers as if they were, in aggregate, a single surface. This method expedites the process of placing all of the surfaces of the drawers in float, ensures repeatability and uniformity between jobs, and reduces the level of expertise required on the part of the furniture maker.

A greater understanding of the method described above may be obtained through a review of the illustrations accompanying this application together with a review of the detailed description that follows.

Figure 1:
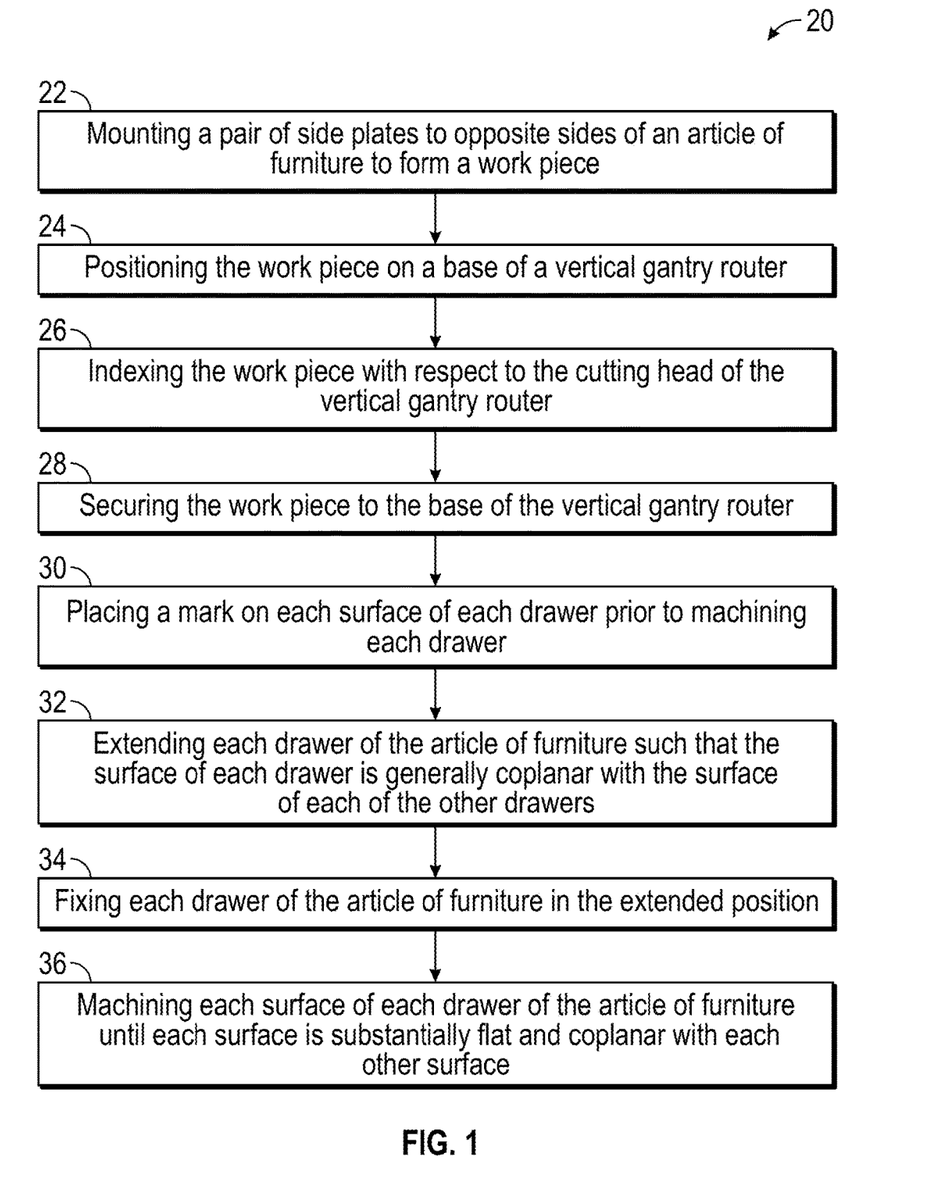
FIG. 1 is a flow chart illustrating a non-limiting embodiment of a method for machining a plurality of surfaces of a respective plurality of drawers of an article of furniture.

FIG. 1 is a flow chart illustrating a non-limiting embodiment of a method 20 for machining a plurality of surfaces of a respective plurality of drawers of an article of furniture. While the various steps of method 20 are numbered sequentially, it should be understood that this sequential numbering is not intended to convey the sequence in which the steps must be performed. Rather, some or all of the steps may be performed in any suitable sequence which may deviate from the sequence illustrated in FIG. 1.

Additionally, although the context for this discussion is with respect to a cabinet having a plurality of drawers for installation on an aircraft, it should be understood that the teachings disclosed herein are not limited to use with articles of furniture that are installed on aircraft. Rather, the teachings disclosed herein may be implemented on any article of furniture regardless of its intended installation location. For example, the teachings disclosed herein may be implemented on articles of furniture intended to be mounted to ships and other watercraft of any type and variety, spacecraft, and ground-based vehicles. The teachings disclosed herein may also be implemented on articles of furniture intended to be mounted in homes, commercial structures, industrial and manufacturing facilities, and the like. Furthermore, the teachings herein are not limited to articles of furniture that are intended to be mounted or installed to some other structure, but may also be applied to articles of furniture that are free standing.

Figure 2:
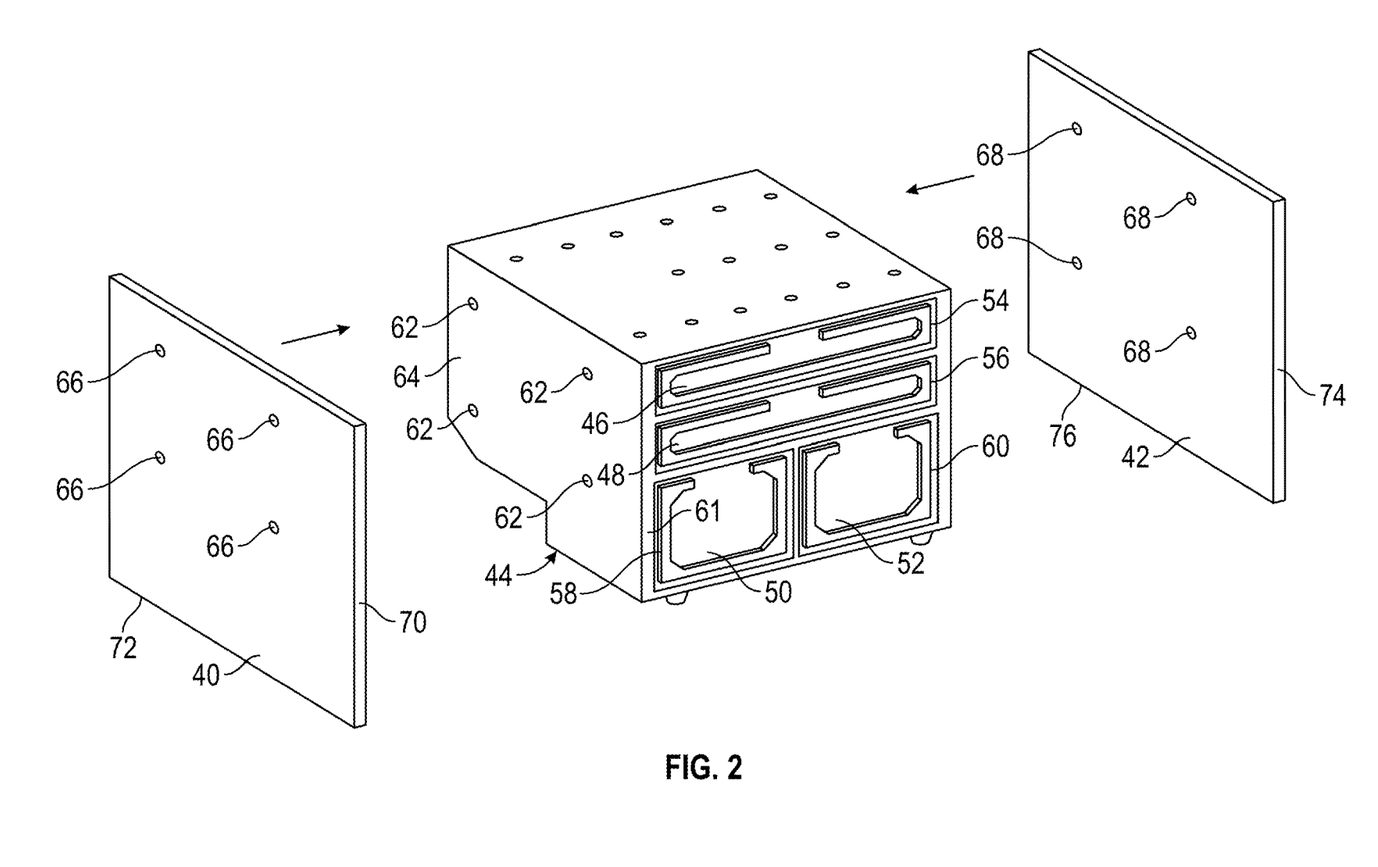
FIG. 2 is a perspective view illustrating a non-limiting embodiment of an article of furniture having a plurality of drawers and a pair of side plates prior to assembly to the article of furniture.
Figure 3:
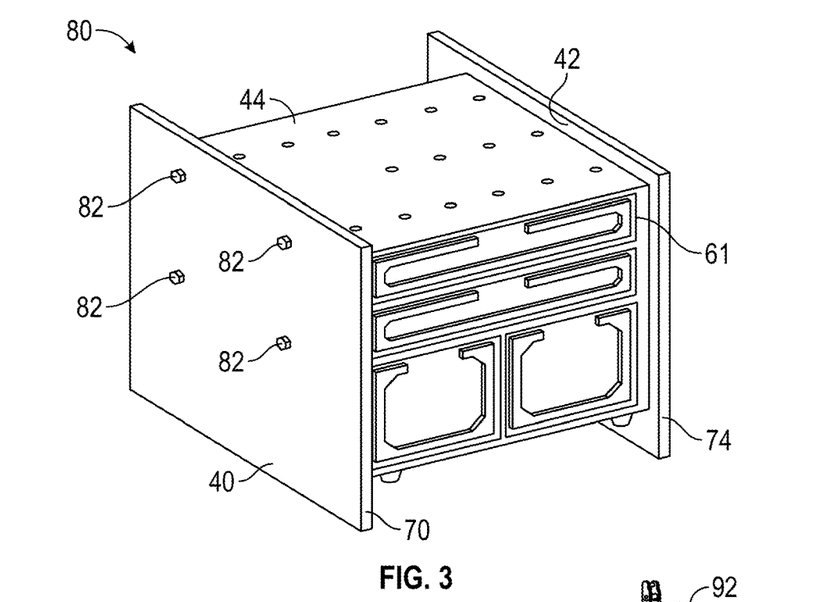
FIG. 3 is a perspective view illustrating a work piece formed from the article of furniture and the side plates illustrated in FIG. 2.

At step 22, a pair of side plates are mounted to an article of furniture to form a work piece. This step is illustrated in FIGS. 2 and 3. In FIG. 2, a side plate 40 and a side plate 42 are positioned on opposite sides of a cabinet 44 having a drawer 46, a drawer 48, a drawer 50, and a drawer 52. Drawers 46, 48, 50, and 52 have not yet been fitted with decorative veneers and accordingly, their respective door scribes are visible. Drawer 46 has a door scribe 54, drawer 48 has a drawer scribe 56, drawer 50 has a drawer scribe 58, and drawer 52 has a drawer scribe 60. Drawer scribes typically have a thickness of between one eighth of an inch to three eighths of an inch. For purposes of discussion and illustration, the thickness of drawer scribes 54, 56, 58, and 60 have been exaggerated. When drawers 46, 48, 50, and 52 are fully seated within cabinet 44, drawer scribes 54, 56, 58, and 60 are recessed below a fascia 61 of cabinet 44. This recess leaves room to mount the decorative veneers that will be assembled to cabinet 44 later on in the assembly process.

Figure 8:
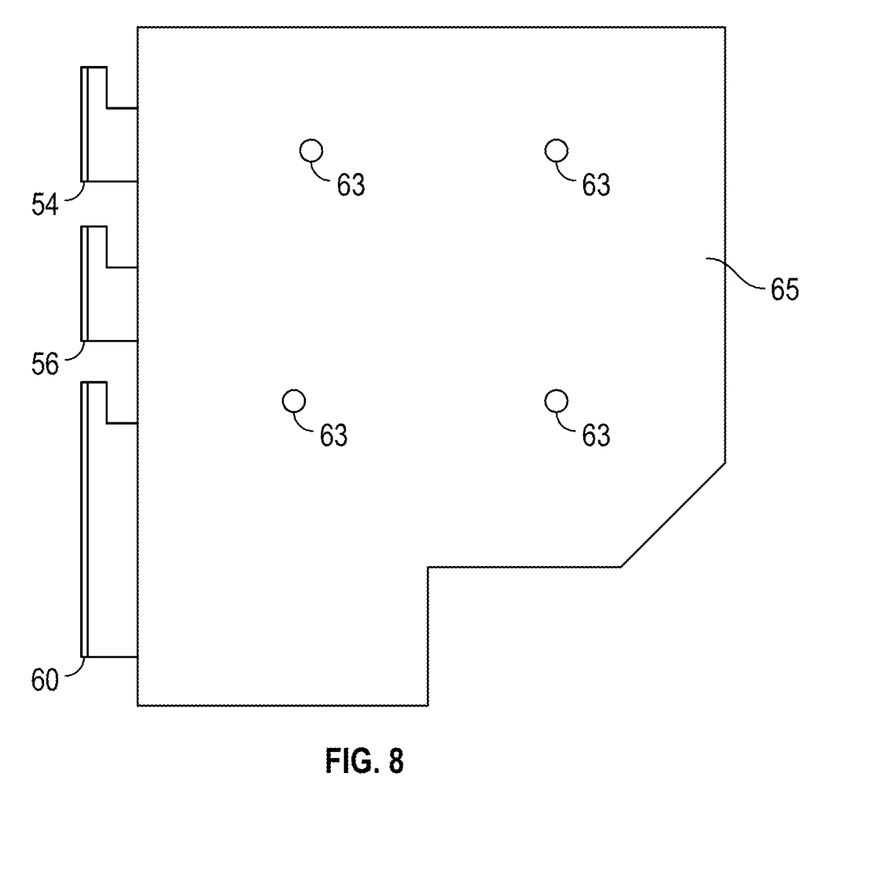
FIG. 8 is a side view illustrating the work piece of FIG. 3 after the performance of the method step illustrated in FIG. 7.

Cabinet 44 include four mounting holes 62 defined in a side 64 of cabinet 44 and four mounting holes 63 defined in a side 65 of cabinet 44 (see FIG. 8). Mounting holes 62 and 63 are arranged and configured to coincide with mounting holes that are defined in the bulkheads and the monuments located onboard the aircraft in which cabinet 44 will be installed. In an embodiment, cabinet 44 will be mounted to the aircraft with mechanical fasteners engaging mounting holes 62 and 63 and corresponding mounting holes defined in the bulkheads and monuments onboard the aircraft.

As illustrated in FIG. 2, four mounting holes 66 are defined through side plate 40 and four mounting holes 68 are defined through side plate 42. Mounting holes 66 are arranged and configured to align with mounting holes 62 and mounting holes 68 are arranged and configured to align with the mounting holes 63. Accordingly, side plate 40 may be attached to side 64 with suitable mechanical fasteners and side plate 42 may be attached to the side of cabinet 44 opposite side 64 with suitable mechanical fasteners.

Side plate 40 has a forward edge 70 and a bottom edge 72 that are each substantially flat and that are substantially perpendicular to one another. Similarly, side plate 42 has a forward edge 74 and a bottom edge 76 that are substantially flat and that are substantially perpendicular to one another. Mounting holes 66 and 68 are arranged in side plates 40 and 42, respectively, in such a way that when side plates 40 and 42 are attached to cabinet 44, side plates 40 and 42 will support cabinet 44 in a position suspended above a ground surface/floor surface in an orientation that mimics the orientation that cabinet 44 will occupy when cabinet 44 is installed in an aircraft. Said another way, side plates 40 and 42 mimic the bulkheads and the monuments onboard the aircraft to which cabinet 44 will be mounted.

It should be understood that the teachings disclosed herein are not limited to the use of a pair of side plates to serve as a support structure for an article of furniture. Rather, any suitable support structure may be employed without deviating from the teachings of the present disclosure.

FIG. 3 illustrates an assembly of cabinet 44, side plate 40, and side plate 42. This assembly will hereinafter be referred to as work piece 80. As illustrated, side plate 40 is affixed to cabinet 44 via four threaded fasteners 82. Four additional threaded fasteners (not illustrated) affix side plate 42 to cabinet 44. As discussed above, work piece 80 presents cabinet 44 in the same orientation that cabinet 44 will occupy when installed onboard an aircraft. In the illustrated embodiment, fascia 61 resides in a slightly recessed position below forward edges 70 and 74. In other embodiments, fascia 61 may be more recessed than illustrated or less recessed than illustrated. In still other embodiments, fascia 61 may be flush with forward edges 70 and 74. In still other embodiments, fascia 61 may be positioned forward of forward edge 70 and 74.

Figure 4:
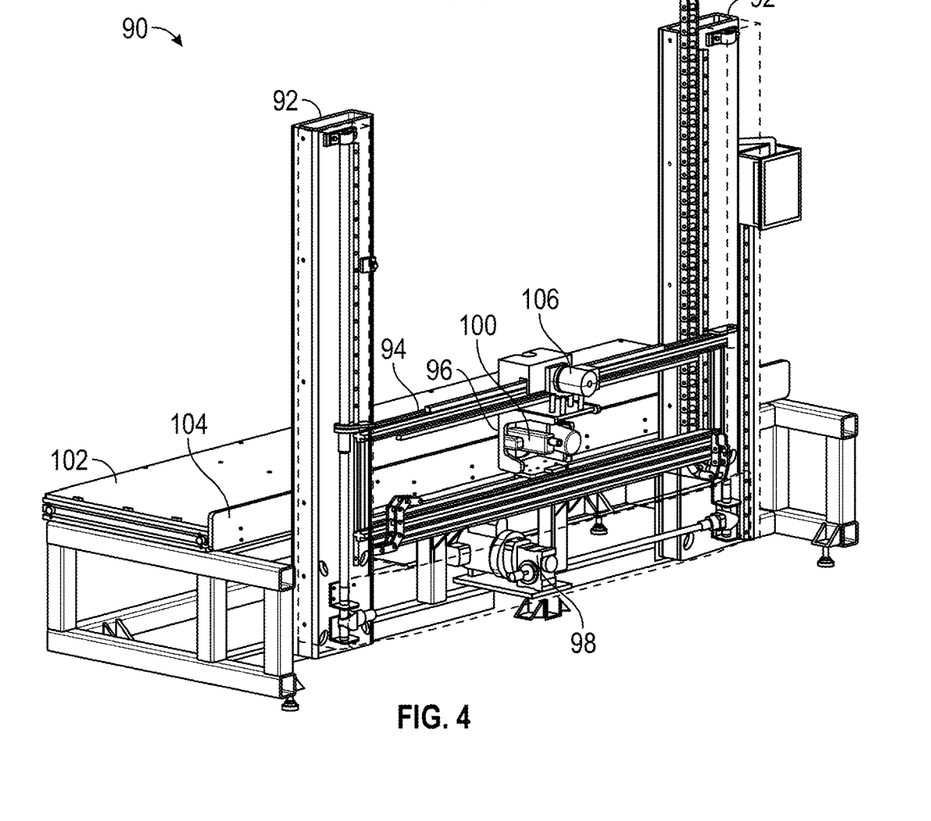
FIG. 4 is a perspective view illustrating a non-limiting embodiment of a vertical gantry router, compatible for use with the method of FIG. 1.

Referring back to FIG. 1, step 24 of method 20 entails positioning the work piece on a base of a vertical gantry router. Vertical gantry routers are known in the art. An exemplary embodiment of a vertical gantry router 90 is illustrated in FIG. 4. Vertical gantry router 90 includes a pair of towers 92, a bridge 94, a cutting head 96, a motor 98, a motor 100, a base 102, a fence 104, and a motor 106. Vertical gantry router is designed to allow an operator to precisely control the vertical and horizontal movement and positioning of cutting head 96 within a plane (the cutting plane). Motor 98 may be actuated by an operator to move bridge 94 vertically along pair of towers 92. Motor 100 may be actuated by an operator to move cutting head 96 horizontally along bridge 94. When cutting head 96 is positioned at a desired location, the operator may actuate motor 106 which will spin the cutting head and enable the operator to cut into a work piece. Cutting head 96 may further be adjusted inward and outward, in a direction that is orthogonal to both bridge 94 and pair of towers 92. This allows the operator to control the depth of the cut into the work piece made by cutting head 96.

Base 102 is a substantially flat, level platform that is oriented parallel to bridge 94 and perpendicular to cutting head 96. This arrangement permits a work piece positioned on base 102 to be oriented substantially perpendicular to cutting head 96. Fence 104 is disposed at a forward end of base 102, proximate pair of towers 92 and is oriented parallel to bridge 94. When a work piece is positioned on base 102, it may be pressed up against fence 104 to ensure that the work piece is oriented perpendicular to cutting head 96. While fence 104 in of vertical gantry router 90 is disposed at an end of base 102 proximate pair of towers 92, in other embodiments, fence 104 may be disposed elsewhere. For example, in some embodiments, fence 104 may be positioned at an opposite end of base 102, remote from pair of towers 92. In other embodiments, fence 104 may be repositionable to provide an operator with a greater level of flexibility in manipulating a work piece.

Figure 5:
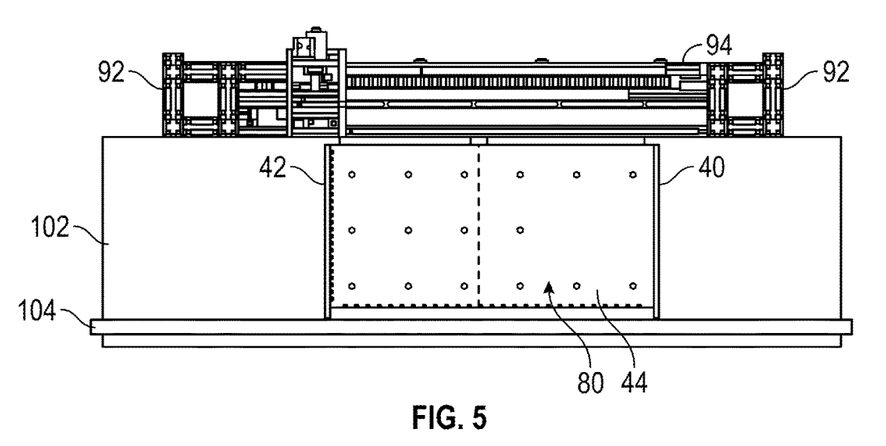
FIG. 5 is a plan view illustrating the work piece of FIG. 4 resting on an alternate embodiment of a vertical gantry router.
Figure 9:
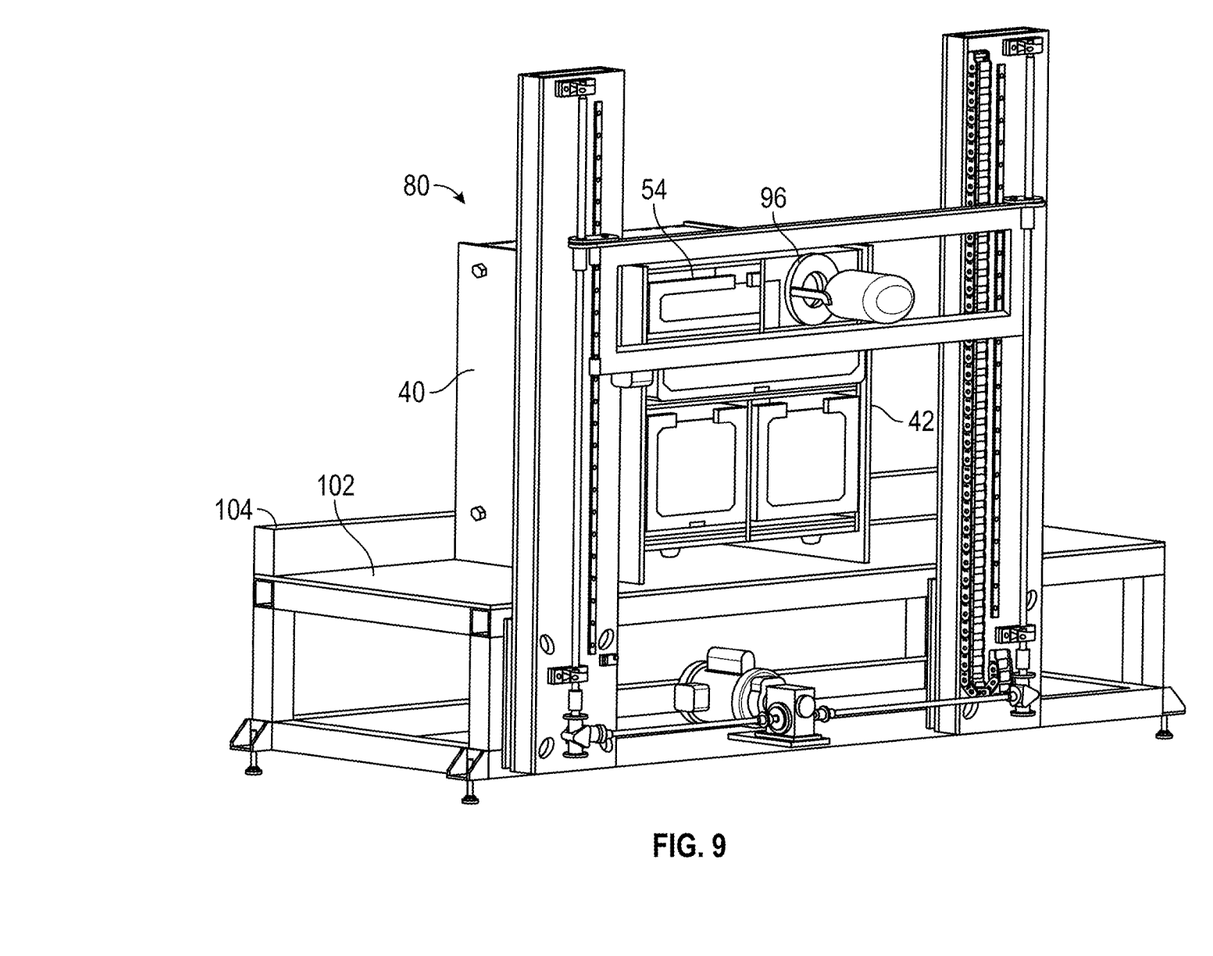
FIG. 9 is a perspective view illustrating the work piece of FIG. 4 resting on the vertical gantry router of FIG. 8.
Figure 10:
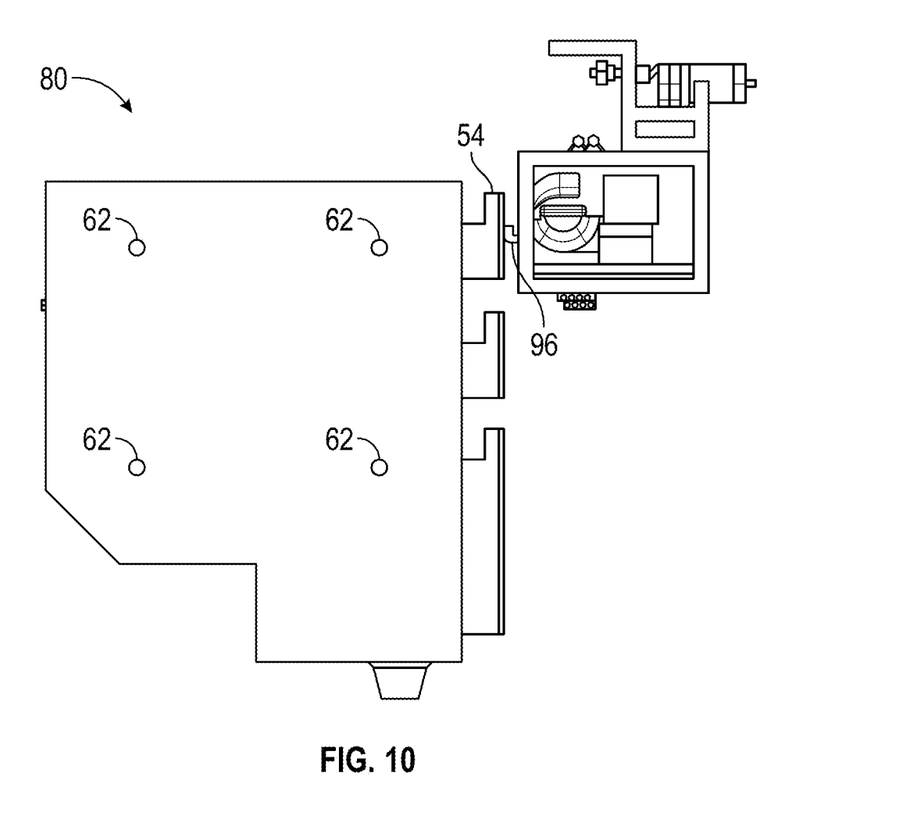
FIG. 10 is a side view illustrating a drawer of the article of furniture as a cutter head of a vertical gantry is positioned to machine the surface of the drawer.

With continuing reference to FIGS. 2-3, work piece 80 is placed on base 102. This arrangement is best seen in FIGS. 5 and 9, discussed below.

Returning to FIG. 1, and with continuing reference to FIGS. 2-4, at step 26, work piece 80 is indexed with respect to cutting head 96. As used herein, the term "index", "indexed", and/or "indexing" in conjunction with work piece 80 refers to the act of orienting work piece 80 square/orthogonally to the cutting head of vertical gantry router 94. This is done by positioning work piece 80 on base 102 and then pushing the work piece against fence 104 such that the edges of both side plate 40 and side plate 42 are in direct contact with fence 104. This is best illustrated in FIG. 5 which provides an overhead view of the above described arrangement. As discussed above, fence 104 may be located at different locations along base 102 and as illustrated in FIG. 5, fence 104 has been moved to a rear portion of base 102. Accordingly, when indexing work piece 80 to cutting head 96, work piece 80 is first lifted over fence 104, then set down on base 102, and then pushed backwards against fence 104. Now work piece 80 is arranged square to cutting head 96.

It should be understood that a work piece may be indexed by means other than through the use of a fence. In other embodiments, any other means, mechanism, structure or component that is effective to square the work piece with respect to the cutting head of the vertical gantry router may be employed without departing from the teachings of the present disclosure.

Returning to FIG. 1, and with continuing reference to FIGS. 2-5, at step 28, in some embodiments, work piece 80 is secured to base 102 of vertical gantry router 90. Work piece 80 may be secured in any suitable manner including, but not limited to, using mechanical fasteners, adhesives, tie downs, cargo straps, or any other means for ensuring that work piece 80 does not move from its indexed position while cutting head 96 cuts into drawer scribes 54, 56, 56, 58, and 60. Rendering work piece 80 immobile will ensure that the cutting action of cutting head 96 will not be disturbed or disrupted and that work piece 80 will not come out of alignment with cutting head 96.

Figure 6:
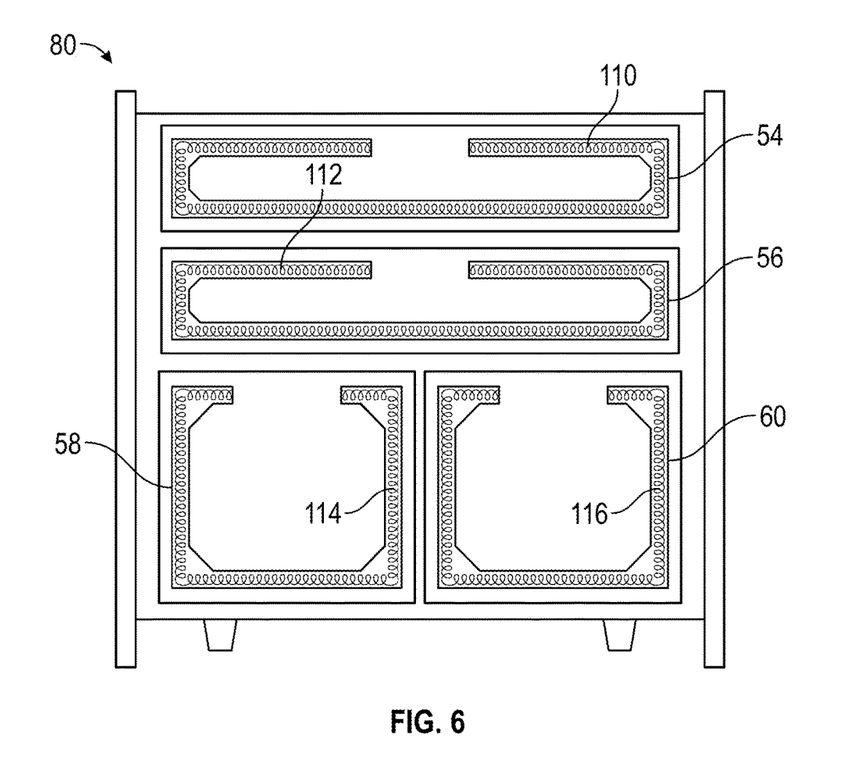
FIG. 6 is a front view illustrating the work piece of FIG. 4 after the performance of one of the steps of the method of FIG. 1.

With continuing reference to FIGS. 1-5, at step 30, in some embodiments, a mark is placed on each surface that is to be cut. With respect to the example discussed in the present disclosure, at step 30, a mark will be placed on the forward surface of drawer scribes 54, 56, 58, and 60. The mark may be made an any suitable fashion (e.g., with pencil, pen, magic marker, paint, etc. . .) and may be placed at multiple locations along the surface to be cut. In some embodiments, the entire surface may be covered with marks. See, for example, FIG. 6, which illustrates work piece 80 after it has been marked. As illustrated in FIG. 6, a mark 110 has been drawn on drawer scribe 54, a mark 112 has been drawn on drawer scribe 56, a mark 114 has been drawn on drawer scribe 58, and a mark 116 has been drawn on drawer scribe 60.

These marks will help an operator to determine when all of the surfaces of the drawer scribes have been cut to the point where they are coplanar/in float. The surface of the drawer scribes, like all materials, will have natural curves, bends, and bows. With continuing reference to FIGS. 1-6, when cutting head 96 cuts across a work piece, it cuts in a single plane, flattening out any curves or bows or any drawer faces/drawer scribes that are out of phase, but only to the extent that the blade of cutting head 96 physically contacts such curves, bows, and out of phase surfaces. In some instances, the surface of the work piece may curve away from the cutting head to the point where the blade of the cutting head comes out of contact with the surface. If the cutting head is not plunged in deeper to lower the lever of the surface of the article of furniture to the same depth as the uncut depression, then this depression in the surface of the drawer scribe (or other surface) will remain and the surface will only be partially coplanar/in float. Without a visual cue, it may be difficult for an operator to detect the loss of contact between the surface and the blade of cutting head 96.

If the surface of the drawer scribe (or other cutting surface) has marks on it, the cutting head will remove the marks as it removes the surface material from the drawer scribe. Conversely, if the blade of cutting head 96 separates from the surface of the drawer scribe because of a depression in the drawer scribe material, then neither the surface material nor the markings will be removed. Therefore, if any markings remain on the surface of a drawer scribe after the cutting head has passed over that surface, the operator will be alerted to the fact that that portion of the surface is shallower than the other portions of the surface that have just been cut. When this happens, the operator will know to increase the depth of cutting head 96 and to make another cutting pass across the entire cutting surface. This process will continue until all of the markings have been removed. Once all of the markings have been removed, the operator will know with certainty that all of the cutting surfaces are coplanar/in float.

Figure 7A:
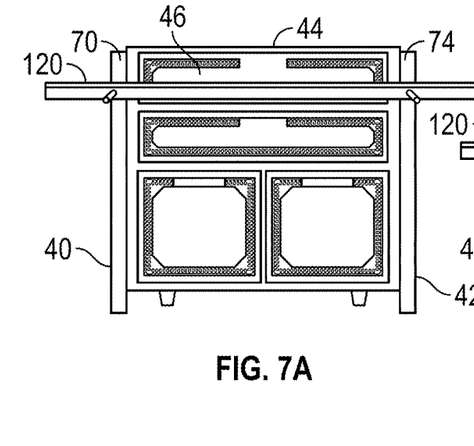
Figures 7B, 7C:
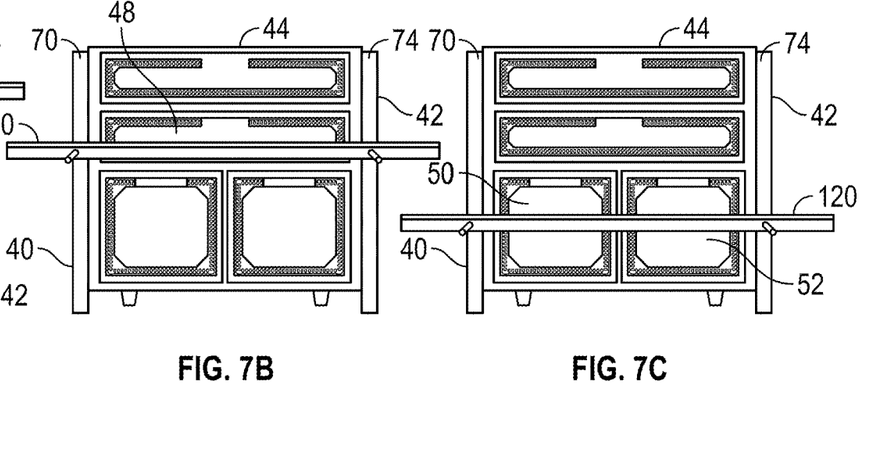

Returning to FIG. 1, at step 32, in some embodiments, each drawer of the article of furniture is extended to a position where the surface of its drawer scribe is substantially coplanar with the surface of each of the other drawer scribes. This is illustrated in FIG. 7. With continuing reference to FIGS. 1-6, this step may be necessary in embodiments where the drawer scribes are recessed below the fascia of the cabinet they reside in and therefore, the drawers must be at least partially extended to allow cutting head 96 of vertical gantry router 90 to make contact with the surface of the drawer scribe.

FIG. 7 presents a series of illustrations depicting an exemplary process for extending each of the drawers of cabinet 44. A straight edge 120 is positioned across forward edge 70 of side plate 40 and forward edge 74 of side plate 42. When situated in this manner, and when further positioned in the path of the drawers of cabinet 44, straight edge 120 serves as a barrier that limits the extension of each drawer of cabinet 44 such that when each drawer is extended to the straight edge, it will be substantially flush with forward edges 70 and 74. In the left most illustration of FIG. 7, straight edge 120 is positioned to obstruct the extension of drawer 46. Drawer 46 is pulled out until it encounters straight edge 120 and it is then left in that extended position. Straight edge 120 is then moved down along forward edges 70 and 74 until it is positioned in front of drawer 48. Drawer 48 is then extended until it encounters straight edge 120, as depicted in the center illustration of FIG. 7. Straight edge 120 is then moved further down along forward edges 70 and 74 until it is positioned in front of drawers 50 and 52. Drawers 50 and 52 are then extended until they encounter straight edge 120. At this point, drawers 46, 48, 50, and 52 are each extended from cabinet 44 and are each substantially coplanar with one another. This is best illustrated in FIG. 8, where side plates 40 and 42 have been omitted for ease of illustration. In FIG. 8, the forward most surfaces of drawer scribes 54, 56, and 60 have been arranged in a substantially coplanar manner (drawer scribe 58 is also coplanar, but is hidden from view in FIG. 8).

Returning to FIG. 1, at step 34, each drawer of the article of furniture is fixed in the extended position. With continuing reference to FIGS. 1-8, the drawers are fixed in the extended position to ensure that they do not retract into cabinet 44 when they are machined by cutting head 96 of vertical gantry router 90. The drawers may be fixed in any suitable manner. In one non-limiting example, the drawers are fixed in the extended position with an adhesive, such as hot glue. To do this, tape is first applied to the cabinet to protect it by preventing marring of the cabinet or damage to the paint. A spacer block is hot glued on two surfaces and then pressed up against the drawer and the cabinet. When the glue dries/cures, it will hold the block in place against both surfaces and will prevent movement of one surface with respect to the other surface. While hot glue may be preferred, any suitable adhesive may be employed. In other embodiments, clamps may be used to fix the drawers in the extended position. In other embodiments, any other suitable means, method or mechanism effective to fix the drawers in the extended position may be employed.

Returning to FIG. 1, at step 36, each surface of each drawer of the article of furniture is machined until each surface is substantially flat and coplanar with each of the other surfaces of each of the other drawers. This step is further illustrated in FIGS. 9-16 and will be discussed in detail below.

FIG. 9 is a perspective view illustrating work piece 80 positioned on base 102 and pressed back against fence 104. When work piece 80 is pushed against, and aligned with, fence 104, work piece 80 is indexed with respect to cutting head 96. Cutting head 96 is positioned in front of a forward surface of drawer scribe 54 and has been plunged inward towards work piece 80 until the blade of cutting head 96 makes contact with the forward surface of drawer scribe 54. The contact between cutting head 96 and drawer scribe 54 can be best seen in FIG. 10, which provides a side view of work piece 80 (with side plates 40 and 42 removed for ease of illustration) and a side view of cutting head 96 (with the majority of vertical gantry router 90 omitted for ease of illustration).

Figure 11:
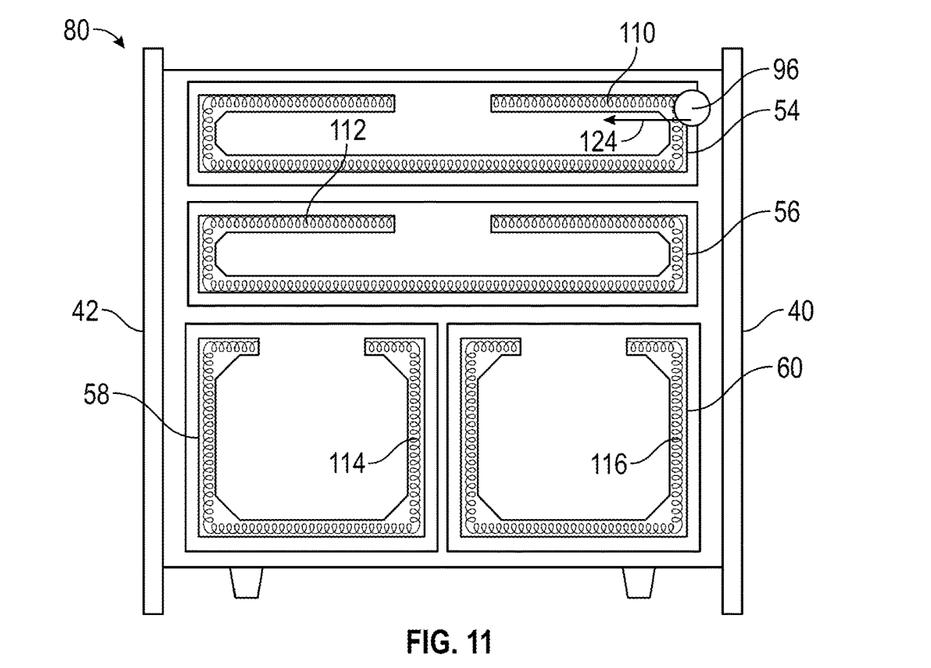
FIGS. 11-16 are front views of the work piece of FIG. 4 during the performance of one of the steps of the method of FIG. 1.

FIG. 11 presents a front view of work piece 80 as cutting head 96 begins to machine the surfaces of drawer scribes 54, 56, 58, and 60. For ease of illustration, only cutting head 96 of vertical gantry router 90 has been illustrated. With continuing reference to FIGS. 1-10, once motor 106 has been actuated, the blade of cutting head 96 will begin to remove material from the surface of drawer scribe 54. As material is machined off of drawer scribe 54, mark 110 will abrade away. An operator will control vertical gantry router 90 so as to move cutting head 96 laterally in the direction indicated by arrow 124 towards the opposite end of drawer scribe 54. As the blade of cutting head 96 passes over each new surface segment of drawer scribe 54, it will remove an amount of material from the surface that corresponds with the plunge depth of the blade and it will simultaneously remove mark 110. During each pass over each of the drawer scribes, the plunge depth for cutting head 96 will remain constant. After each pass is complete, if additional cutting is required, then cutting head 96 will be plunged towards work piece 80 by an incremental amount and another cutting pass will be made.

Figure 12:
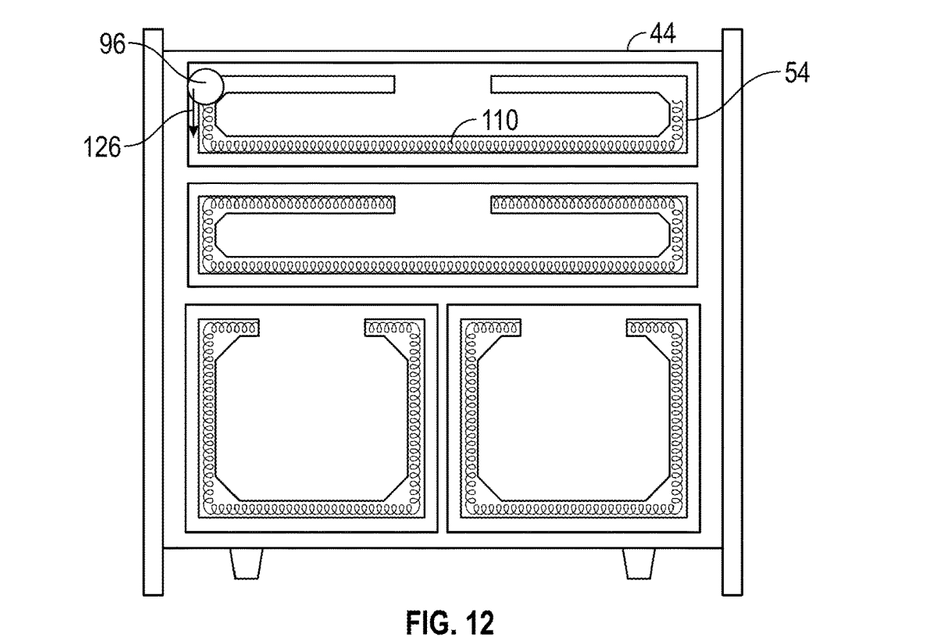

In FIG. 12, cutting head 96 has travelled to the opposite end (left side of cabinet 44). The surface of drawer scribe 54 that has already been machined now has a shallower depth than it had at the start of the machining process. Because a top layer of drawer scribe 54 has been removed, mark 110 has also been removed. The absence of any remnant of mark 110 after cutting head 96 passes over the surface of drawer scribe 54 serves as evidence that there were no valleys or depressions in the surface of drawer scribe 54 that will require a second pass of cutting head 96. The operator will now move cutting head 96 in the direction indicated by arrow 126 by a distance equal to the width of cutting head 96, removing surface material as it moves downward.

Figure 13:
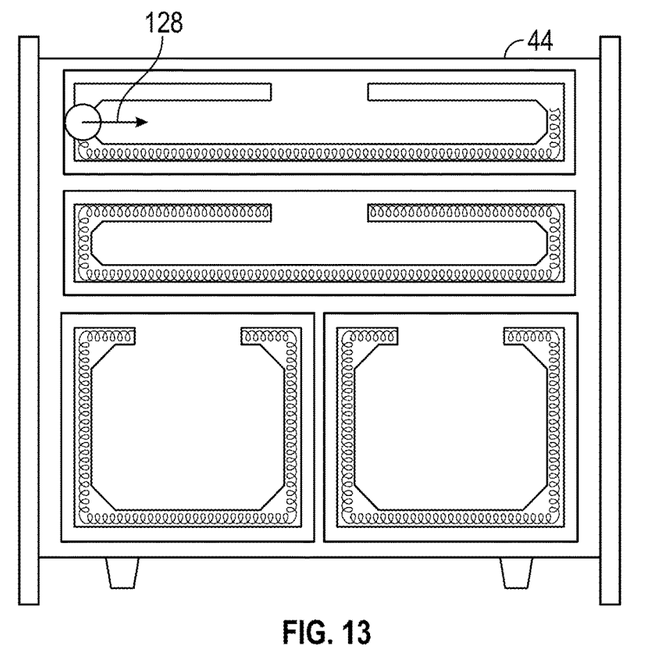

In FIG. 13, cutting head 96 has been moved downward by approximately the width of cutting head 96 and is about to begin moving in the direction indicated by arrow 128, towards the opposite side of cabinet 44.

Figure 14:
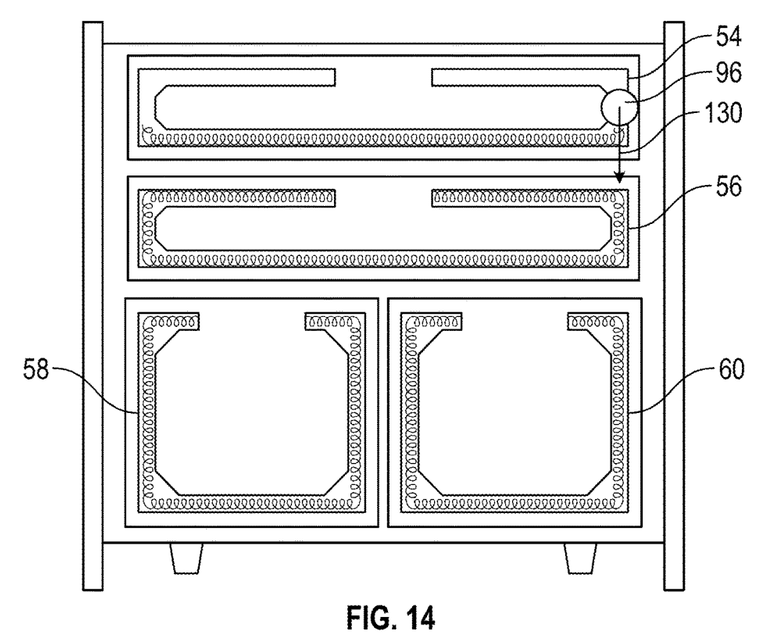

In FIG. 14, cutting head 96 has reached the opposite side of cabinet 44 and moves downward in the direction indicated by arrow 130 by a distance substantially equal to the width of cutting head 96. The process described and illustrated with respect to FIGS. 11-14 will begin again and will be repeated until the entire surface of each of drawer scribes 54, 56, 58, and 60 has been machined.

Figure 15:
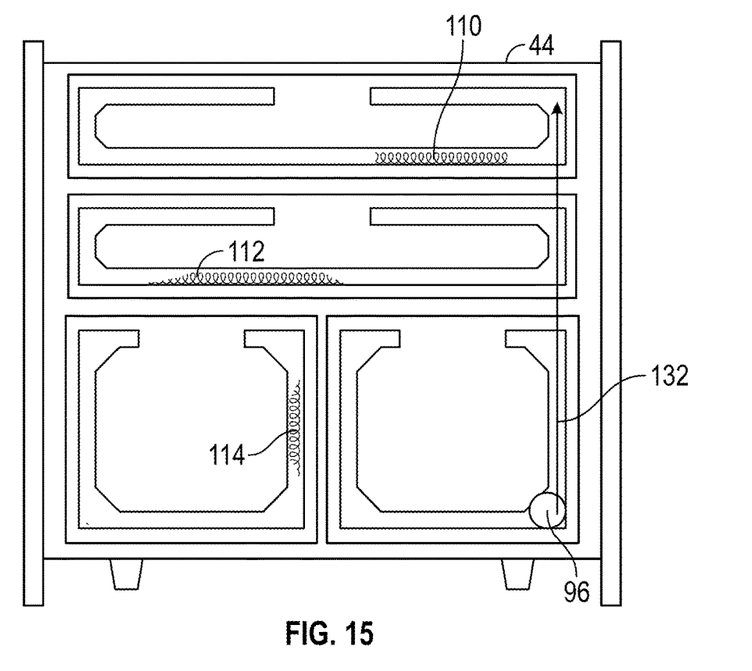

In FIG. 15, cutting head 96 has reached the bottom of cabinet 44. As illustrated, portions of mark 110, 112, and 114 remain visible. From this, it can be concluded that those regions represent low spots that fell below the reach of the blade of cutting head 96 during its first pass. The operator, upon observing this, will move cutting head 96 as indicated by arrow 132 to reposition cutting head 96 at the top right portion of cabinet 44 and will begin the process described above with respect to FIGS. 11-15 over again.

Figure 16:
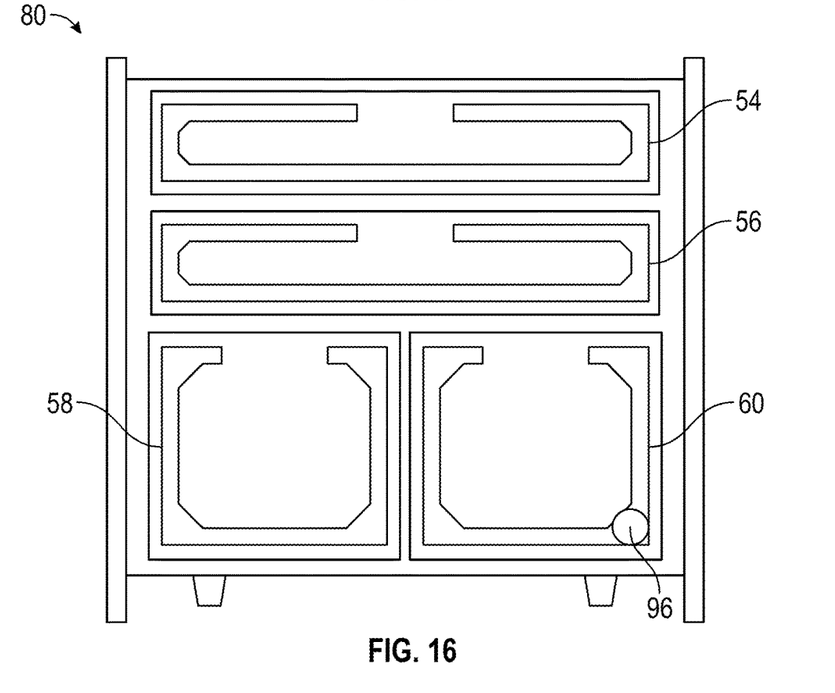

At FIG. 16, cutting head 96 has completed its second pass over the surfaces of door scribes 54, 56, 58, and 60. As can be observed in FIG. 16, the surface of each drawer scribe is now free of any marks. This means that there were no depressions in the surfaces of the drawer scribes that fell below the cutting blade of cutting head 96 during the second pass. This also means that the forward surface of each of drawer scribes 54, 56, 58, and 60 are now coplanar/in float with each of the surfaces of each of the other drawer scribes and that no further machining will be necessary.

With continuing reference to FIGS. 1-16, after the machining has been completed, the operator may deactivate motor 106, remove work piece 80 from base 102, release drawers 46, 48, 50, and 52 from their extended positions, remove side plates 40 and 42 from cabinet 44, and begin assembling a new work piece to begin the process again.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for machining a plurality of surfaces of a respective plurality of drawers of an article of furniture, the method comprising the steps of:
   mounting a side of the article of furniture to a support structure to form a work piece;
   positioning the work piece on a base of a vertical gantry router in an orientation such that the plurality of surfaces are generally perpendicular to a cutting head of the vertical gantry router;
   moving each drawer of the respective plurality of drawers relative to the side of the article of furniture to an extended position such that the plurality of surfaces are generally aligned with one another in a single plane;
   fixing each of the drawers in the extended position to define the drawers in fixed, extended positions relative to the side of the article of furniture; and
   machining the plurality of surfaces of the drawers in the fixed, extended positions with the vertical gantry router until the plurality of surfaces are substantially flat and substantially coplanar with one another.

2. The method of claim 1, wherein the step of fixing each of the drawers comprises fixing each of the drawers in the extended position with hot glue.

3. The method of claim 1, wherein the work piece is secured to the base of the vertical gantry router prior to the machining step.

4. The method of claim 1, further comprising the step of:
   releasing the drawers from the fixed, extended positions after the machining step to allow each of the drawers to move relative to the side of the article of furniture.

5. A method for machining a plurality of surfaces of a respective plurality of drawers of an article of furniture, the method comprising the steps of:
   mounting a pair of side plates to opposite sides of the article of furniture to form a work piece, each side plate having a forward edge and a bottom edge that are substantially square to one another;
   positioning the work piece on a base of a vertical gantry router, the base being substantially square to a cutting head of the vertical gantry router, the work piece being supported on the base by a bottom surface of each side plate of the pair of side plates;
   indexing the work piece with respect to the cutting head;
   extending each drawer of the respective plurality of drawers relative to the opposite sides of the article of furniture to an extended position such that each surface of the plurality of surfaces is generally planer with each other surface of the plurality of surfaces;
   fixing each drawer of the plurality of drawers in the extended position to define the drawers in fixed, extended positions relative to the opposite sides of the article of furniture;
   machining each surface of the plurality of surfaces of the drawers in the fixed, extended positions until each surface is substantially flat and substantially coplanar with each of the other surfaces of the plurality of surfaces.

6. The method of claim 5, wherein the article of furniture comprises a cabinet configured to be mounted to an aircraft.

7. The method of claim 6, wherein the opposite sides of the cabinet include a plurality of mounting holes configured to enable the cabinet to be mounted to the aircraft, and wherein the pair of side plates are mounted to the cabinet via the plurality of mounting holes.

8. The method of claim 5, wherein indexing the work piece with respect to the cutting head comprises pushing the work piece up against a fence of the vertical gantry router, the fence being oriented substantially square and parallel to the cutting head.

9. The method of claim 8, wherein the fence is disposed at a forward portion of the base and wherein pushing the work piece against the fence comprises pushing the work piece in a forward direction along the base until the work piece contacts and aligns with the fence.

10. The method of claim 8, wherein the fence is disposed at a rear portion of the base and wherein pushing the work piece against the fence comprises pushing the work piece in a rearward direction along the base until the work piece contacts and aligns with the fence.

11. The method of claim 5, further comprising the step of securing the side plates to the base.

12. The method of claim 5, wherein the step of extending each drawer of the plurality of drawers to the extended position comprises extending each drawer until each surface of the plurality of surfaces makes contact with a straight edge placed against the forward edge of each side plate of the pair of side plates.

13. The method of claim 12, wherein positioning the straight edge against the forward edge of each side plate comprises positioning the straight edge at a location that will intercept each drawer when each drawer is extended.

14. The method of claim 13, wherein the positioning of the straight edge is repeated until the straight edge has been positioned to intercept each drawer of the plurality of drawers.

15. The method of claim 5, wherein the step of fixing each drawer of the plurality of drawers in the extended position comprises gluing each drawer in the extended position.

16. The method of claim 15, wherein the step of fixing each drawer of the plurality of drawers in the extended position comprises using hot glue to fix each drawer in the extended position.

17. The method of claim 5, wherein further comprising the step of placing a mark on each surface of the plurality of surfaces prior to machining a forward surface of each drawer.

18. The method of claim 17, wherein the step of placing the mark on each surface of the plurality of surfaces comprises placing ink on each surface.

19. The method of claim 17, wherein the machining step is performed until the mark on each surface has been machined off.

20. The method of claim 5, wherein the machining step comprises moving a cutter head of the vertical gantry router along a cutting plane from a first side of the work piece to a second side of the work piece in a first direction, moving the cutter head in a second direction in the cutting plane by an amount equal to a width of the cutter head, the second direction being substantially perpendicular to the first direction, and then moving the cutter head in the cutting plane in a third direction from the second side of the work piece to the first side of the work piece, the third direction being substantially opposite to the first direction.

* * * * *